(12) United States Patent
Li

(10) Patent No.: US 11,822,419 B2
(45) Date of Patent: Nov. 21, 2023

(54) ERROR INFORMATION PROCESSING METHOD AND DEVICE, AND STORAGE MEDIUM

(71) Applicant: Lenovo (Beijing) Limited, Beijing (CN)

(72) Inventor: Xiaochun Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/679,062

(22) Filed: Feb. 23, 2022

(65) Prior Publication Data
US 2023/0009868 A1   Jan. 12, 2023

(30) Foreign Application Priority Data
Jul. 8, 2021   (CN) .......................... 202110772948.9

(51) Int. Cl.
*G06F 11/07*   (2006.01)
(52) U.S. Cl.
CPC ........ *G06F 11/0772* (2013.01); *G06F 11/073* (2013.01); *G06F 11/0751* (2013.01)
(58) Field of Classification Search
CPC . G06F 11/0772; G06F 11/073; G06F 11/0751
USPC ...................................... 714/34, 36, 6.1, 6.11
See application file for complete search history.

(56) References Cited

U.S. PATENT DOCUMENTS

| 2017/0277587 A1* | 9/2017 | Matsuzawa | .......... G06F 11/0778 |
| 2018/0336139 A1* | 11/2018 | Rao | ...................... G11C 16/105 |
| 2019/0340063 A1* | 11/2019 | Chao | ................... G06F 11/0772 |

FOREIGN PATENT DOCUMENTS

JP   2004280140 A   * 10/2004

* cited by examiner

*Primary Examiner* — Chae M Ko
(74) *Attorney, Agent, or Firm* — ANOVA LAW GROUP, PLLC

(57) ABSTRACT

An error information processing method includes, in response to a memory error triggering an interrupt, collecting error information of the memory error that includes a first memory area where the memory error occurs, obtaining a second memory area for writing log information, determining whether the second memory area contains the first memory area, and, in response to determining that the second memory area contains the first memory area, skipping a process of writing the log information into the second memory area.

20 Claims, 3 Drawing Sheets

ERROR INFORMATION PROCESSING METHOD AND DEVICE, AND STORAGE MEDIUM

CROSS-REFERENCE TO RELATED APPLICATION

This application claims priority to Chinese Patent Application No. 202110772948.9, filed on Jul. 8, 2021, the content of which is incorporated herein by reference in its entirety.

TECHNICAL FIELD

The present disclosure generally relates to the field of computer information processing and, more particularly, to an error information processing method and device, and a storage medium.

BACKGROUND

During a startup process of a system boot program, computer hardware will be checked. When a fatal error occurs in memories of some areas, subsequent operations will still access the memories where the fatal error has occurred, resulting in continuous interruptions and eventually causing the system to fail.

SUMMARY

In accordance with the disclosure, there is provided an error information processing method including, in response to a memory error triggering an interrupt, collecting error information of the memory error that includes a first memory area where the memory error occurs, obtaining a second memory area for writing log information, determining whether the second memory area contains the first memory area, and, in response to determining that the second memory area contains the first memory area, skipping a process of writing the log information into the second memory area.

Also in accordance with the disclosure, there is provided a device including a processor and a computer-readable storage medium storing instructions that, when executed by the processor, cause the processor to, in response to a memory error triggering an interrupt, collect error information of the memory error that includes a first memory area where the memory error occurs, obtain a second memory area for writing log information, determine whether the second memory area contains the first memory area, and in response to determining that the second memory area contains the first memory area, skip a process of writing the log information into the second memory area.

Also in accordance with the disclosure, there is provided a computer-readable storage medium storing instructions that, when executed by a processor, cause the processor to, in response to a memory error triggering an interrupt, collect error information of the memory error that includes a first memory area where the memory error occurs, obtain a second memory area for writing log information, determine whether the second memory area contains the first memory area, and in response to determining that the second memory area contains the first memory area, skip a process of writing the log information into the second memory area.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Hereinafter, embodiments consistent with the disclosure will be described with reference to drawings. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

In the present disclosure, description with reference to the terms "one embodiment," "some embodiments," "example," "specific example," or "some examples," etc., mean specific features, structures, materials, or characters described in connection with the embodiment or example are included in at least one embodiment or example of the present disclosure. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, as long as they do not conflict with each other.

In the present disclosure, the terms "first" and "second" are only used for descriptive purposes, and should not be understood as indicating or implying relative importance or implying the number of indicated technical features. Thus, a feature associated with "first," "second" may expressly or implicitly include at least one of that feature. In the description of the present disclosure, "plurality" means two or more, unless otherwise expressly and specifically defined.

Figure 1:
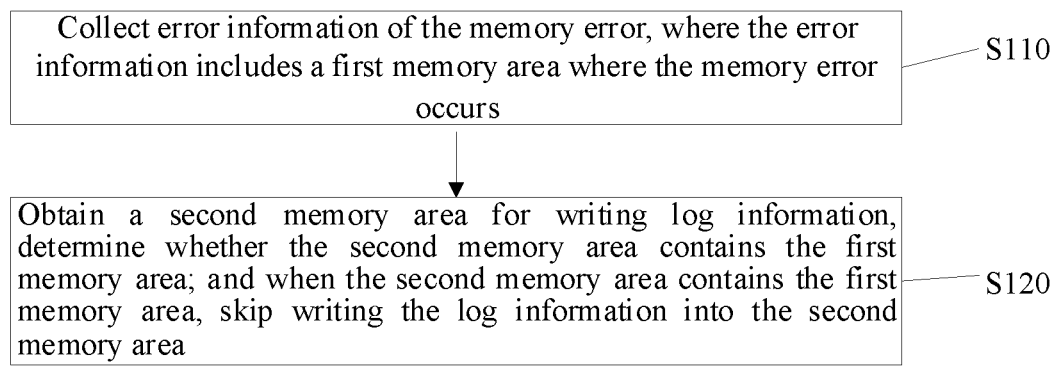
FIG. 1 is a flow chart of an exemplary error information processing method consistent with the present disclosure.

FIG. 1 shows a flow chart of an error information processing method consistent with the disclosure. As shown in FIG. 1, the method includes executing following processes when a memory error triggers a first interrupt: S110, collecting error information of the memory error, where the error information includes a first memory area where the memory error occurs; and S120, acquiring a second memory area for writing log information, determining whether the second memory area includes the first memory area, and when the second memory area includes the first memory area, skipping the step of writing log information into the second memory area.

The first interrupt mainly refers to an operation system interrupt triggered by the memory error, and the error information processing method of the present disclosure may be mainly executed by the operation system.

Further, the error information processing method of the present disclosure may usually be executed by an interrupt handler corresponding to the first interrupt in the operation system. For example, assuming that the first interrupt is a machine check exception (MCE) interrupt, the error information processing method may be executed through an MCE interrupt handler corresponding to the MCE interrupt.

At S110, the error information of the memory error may usually be obtained from a relevant CPU register and put into a register corresponding to the first interrupt by firmware through tools such as an interrupt handler when the first interrupt is triggered. The register can be, for example, an MCE register (MCE bank). Commonly used firmware may include: Unified Extensible Firmware Interface (UEFI), or Basic Input Output System (BIOS), and so on.

Correspondingly, when the first interrupt is processed by the first interrupt handler in the operation system, the error information of the memory error may be collected from the register corresponding to the first interrupt. The error information may include the first memory area where the memory error occurs.

The first memory area where a memory error occurs may usually be a range of memory addresses or a specific memory page number.

Once the first memory area where the memory error occurs is obtained, the first memory area may be compared with the memory area to be operated subsequently. When the memory area to be operated subsequently includes the first memory area, certain measures may be taken to prevent subsequent operations from accessing the first memory area again, to avoid triggering the first interrupt again.

When the operation system processes the first interrupt, it is usually needed to write relevant log information, especially the error information that caused the interrupt, into the designated second memory area, such that maintenance personnel could analyze the cause of the interrupt and fix the problem. When the second memory area includes the first memory area where the memory error occurs, the first interrupt may be triggered again when the log information is written. Therefore, the second memory area for writing the log information may be obtained at S120.

In the error information processing method provided by the present embodiment, before the log information is written, the second memory area for writing the log information may be obtained and compared with the first memory area where the memory error occurs. When the second memory area includes the first memory area, writing the log information to the second memory area may be skipped, to avoid accessing the first memory area and triggering the first interrupt again.

In the error information processing method provided by the present embodiment, after the memory error triggers the system interrupt (such as an MCE interrupt), the first memory area where the memory error occurs may be obtained at S110. Then, before the log information is written, the second memory area for writing the log information may be obtained, and a processing logic for determining whether the second memory area contains the first memory area where memory error occurs may be performed. Once it is determined that the second memory area contains the first memory area where memory error occurs, writing log information into the second memory area may be skipped.

Correspondingly, it may be possible to avoid the problem of system outage caused by the continuous triggering of the first interrupt due to the log information writing operation performed when the first interrupt is processed.

It should be noted that the embodiment shown in FIG. 1 is only a basic embodiment of the error information processing method of the present disclosure, and further refinement and expansion can be made on the basis of the method.

In one embodiment, before collecting the error information of the memory error, the method may further include: when the memory error triggers the first interrupt, recording the error information of the memory error.

To ensure that the operation system is able to obtain the first memory area where the memory error occurs when processing the first interrupt, it may be needed to ensure that the error information of the memory error is recorded before the error information of the memory error is collected.

As mentioned above, when the memory error triggers the first interrupt, the firmware may usually fetch the memory error from the relevant CPU register through tools such as the interrupt handler and put it into the register corresponding to the first interrupt. Of course, there may be differences or changes in different operation systems or firmware, and the implementation may also adopt other methods, such as modifying the interrupt handler in the firmware, or adding custom interrupt processing steps to record the error information of the memory error (including the first memory area where the memory error occurs) in a register or other data storage medium accessible to the interrupt handler corresponding to the first interrupt in the operation system.

In one embodiment, acquiring the second memory area for writing the log information may include: acquiring the second memory area for writing the log information from a system memory defined in an error record serialization table (ERST).

When the operation system interacts with the firmware, the system memory defined in the ERST table, i.e., the second memory area for writing the log information, is usually used to transmit information. Therefore, in this embodiment, the system memory defined in the ERST may be used to obtain the second memory area for writing the log information. Correspondingly, the second memory area for writing the log information may be obtained conveniently and quickly.

In one embodiment, after writing the log information into the second memory area is skipped, the method may further include: writing the log information into a spare memory area of the second memory area.

Usually, after writing the log information into the second memory area is skipped, the log information related to the first interrupt may no longer be obtained, which is very unfavorable for repairing the related problem that causes the first interrupt.

In the present disclosure, after writing the log information into the second memory area is skipped, the spare memory area may be obtained and the log information may be written into the spare memory area, to ensure that the first interrupt will not be triggered again and also to reserve the log information for analyzing the reason of the first interrupt and resolving the problem.

The spare memory area may be determined dynamically and randomly, but it may need to be ensured that the randomly allocated spare memory area is passed to the subsequent processing process such that log information is able to be obtained from the spare memory area. In some other embodiments, the spare memory area may be preset. Therefore, the spare memory area may not need to be passed and the preset spare memory area may be used directly to obtain the log information.

In one embodiment of the present disclosure, before writing the log information into the spare memory area of the second memory area, the method may further include: during system initialization, reserving a third memory area as the spare memory area of the second memory area.

In this embodiment, the spare memory area of the second memory area may be a memory area reserved during system initialization, and the memory area may be set as the spare memory area of the second memory area during initialization.

As such, when the second memory area includes the first memory area where the memory error occurs, the log information may be written into the spare memory area.

In one embodiment of the present disclosure, the method may further include: acquiring a fourth memory area to be used by a first processing program for processing the first interrupt, determining whether the fourth memory area includes the first memory area, and when the fourth memory area includes the first memory area, marking the first memory area as unavailable.

When the first interrupt is being processed, other processing programs may also be called. For example, when the first interrupt is caused by an error with a high error level that will trigger a system restart (panic), it may be possible to record the log information and also perform system restart, and the system restart program is another processing program that needs to be called in this case, that is, the first processing program.

When the first processing program also needs to access a memory area, and the memory area happens to include the first memory area where the memory error occurs, the first processing program may access the first memory area again, thereby triggering the first interrupt again.

Therefore, in this embodiment, in addition to checking the second memory area in which the log information is written, the memory area to be used by the first processing program, that is, the fourth memory area, may be also acquired. After that, whether the fourth memory area contains the first memory area where the memory error occurs may be determined. When it is determined that the fourth memory area contains the first memory area where the memory error occurs, corresponding measures may be performed such that the first processing program does not access the first memory area where the memory error occurs, for example, marking the first memory area as unavailable.

As such, it may be possible to avoid the problem of system outage caused by continuously triggering the first interrupt because the first processing program is called to access the first memory area where the memory error occurs again when the first interrupt is processed.

In one embodiment of the present disclosure, after marking the first memory area as unavailable, the method may further include: acquiring a fifth memory area that does not include the first memory area; and allocating the fifth memory area to the first processing program for use.

As mentioned above, once the first memory area is marked as unavailable, the fourth memory area that includes the first memory area cannot meet the needs of the first processing program to store data, such that the first processing program cannot be successfully executed.

In the embodiment, in this case, the fifth memory area that does not include the first memory area may be acquired; and the fifth memory area may be allocated to the first processing program to ensure that the first processing program can be executed smoothly.

In one embodiment, the first processing program may include a crashed kernel program. Correspondingly, marking the first memory area as unavailable may include: modifying a system memory mapping table provided by a kernel crash dump tool to the crashed kernel program, to mark the first memory area in the system memory mapping table as unavailable.

The kernel crash dump tool may refer to a system tool, such as Kdump, that is capable of saving the system state and important information in time when the system crashes.

The crashed kernel program may refer to a backup kernel program that can be used when the main kernel program has crashed, for example, the crash kernel in a Linux operation system.

The system memory mapping table may refer to a table that maps a virtual memory or a memory allocated for a specific purpose to an actual physical memory address, for example, an E820 table provided by Kdump to crash kernel.

The above embodiments of various error information processing methods are used as examples to illustrate the refine and expansion of the embodiment in FIG. 1, and do not limit the scope of the present disclosure. The above embodiments may be combined flexibly according to actual needs and conditions.

Figure 2:
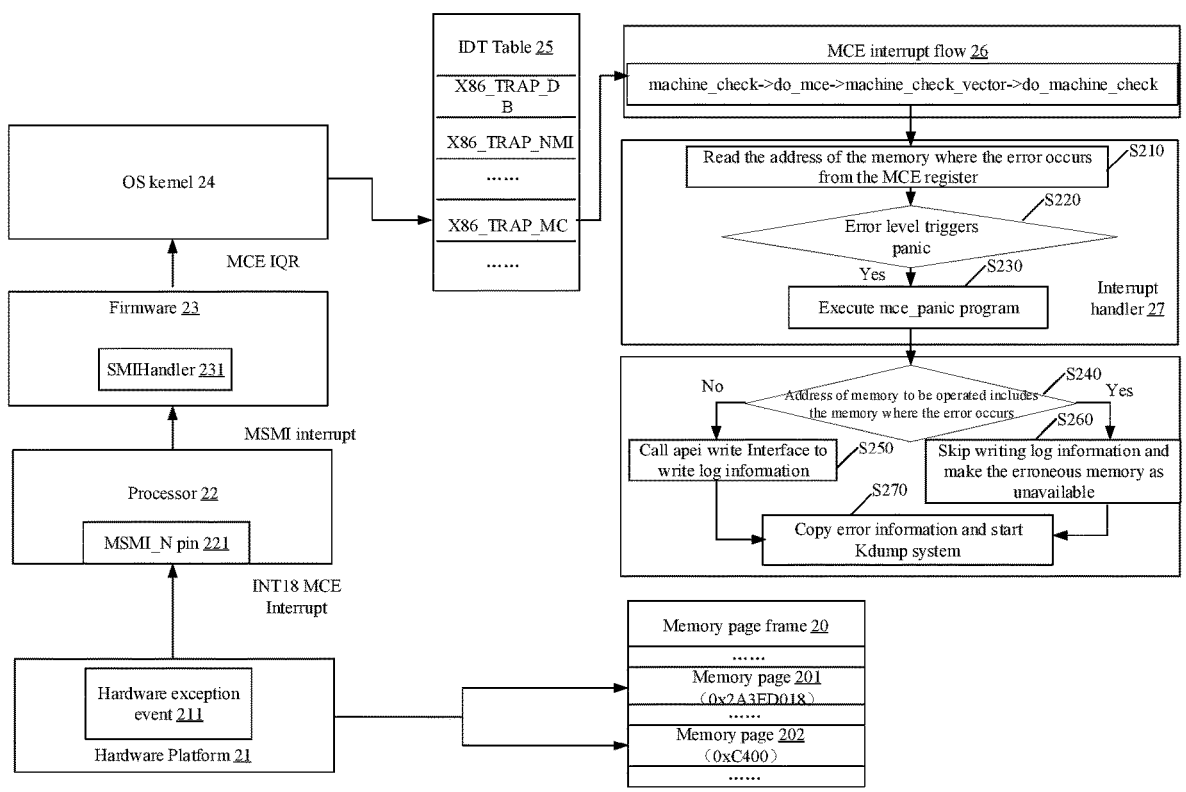
FIG. 2 is a flow chart of another exemplary error information processing method consistent with the present disclosure.

FIG. 2 shows another error information processing method consistent with the disclosure, which is used for a scene where a computer triggers an operation system exception after detecting a memory error during hardware checking.

As shown in FIG. 2, when a hardware platform 21, for example, a memory controller, finds that two memory pages (a memory page 201 with an address of 0x2A3ED018 and a memory page 202 with an address of 0xC400) have errors when checking a memory page frame 20, an MCE interrupt INT18MCE with an interrupt number of 18 is sent to a processor 22. The processor 22 generates an MSMI interrupt by pulling down an MSMI pin and sends the MSMI interrupt to firmware 23. The firmware 23 is provided with a system management interrupt (SMI) handler, for example, SMIhandler 231. SMIhandler 231 collects the error information including the erroneous memory address, and stores the collected error information in an MCE register. After that, the firmware 23 sends an interrupt request (Interrupt ReQuest, IRQ) representing the MCE to an operation system kernel 24 (OS Kernel). After the operation system kernel 24 receives the MCE IRQ, the operation system kernel 24 searches for an interrupt vector (X86_TRAP_MC) corresponding to the MCE from an interrupt vector table 25 (IDT Table), and obtains an entry address of an MCE interrupt flow 26 from it. Then, the MCE interrupt flow 26 is called to execute the corresponding processing procedure. In terms of program calling relationship and execution order, the MCE interrupt handler mainly executes: machine_check→do_mce→machine_check_vector→do_machine_check. When do_machine_check is executed, the MCE interrupt flow 26 calls the interrupt handler 27 to perform S210 to S270.

At S210, the address of the memory where the error occurs is read from the MCE register.

The address of the memory where the error occurs may be stored in the MCE register by SMIhandler 231 when collecting the error information.

At S220, it is determined whether the error level will trigger the system panic. When the error level will trigger the system panic, S230 is executed; when it will not, other corresponding processing may be performed.

The error level may mainly refer to the error level that triggers the MCE interrupt, and may be defined differently in different systems. Usually, the system may define which error levels will trigger the system panic.

If the error level is low, the error may be automatically corrected and the system may still continue to operate. At this point, when the corresponding memory area is used, it may be likely that there is no previous error, and the corresponding interrupt may not be triggered again. Therefore, no additional processing except waiting for the error to be fixed by itself may be performed, to reduce the number of processing steps and maintain the availability of the memory area as much as possible.

If the error level is high that the system cannot continue to operate, the error level may usually be defined as the error level that triggers the system panic. Once an error of this level is found, an emergency plan, such as the mce_panic program executed by operation S230, may be triggered to rescue.

The mce_panic program executed at S230 may include two operations: 1) calling the apei write interface to write log information in the memory page 201; 2) copying the error information into the memory.

To prevent the above two operations from triggering an error exception in the memory page 201 and the memory page 202 again and causing an infinite loop, this embodiment adds the following checking and judgment logics before execution of the two operations.

At S240, it is determined whether the memory address to be operated is the memory address where the error occurs. When the memory address to be operated is not the memory address where the error occurs, S250 may be performed subsequently; and if the memory address to be operated is the memory address where the error occurs, S260 may be performed subsequently.

For the "apei write" operation, the memory address to be operated may be obtained through the system memory defined in ERST for processing MCE; and for the "copy error information" operation, the memory address to be operated may be obtained through the E820 table which is provided by the kdump service to the crash kernel.

At S250, the apei write interface is called to write log information.

At S260, writing the log information is skipped, the E820 table is modified to set the memory page where the serious error occurs as unavailable.

After that, S270 is executed, to start the Kdump system and call the crash kernel to copy the error information.

As such, when the memory area used by the apei write interface to write the log information contains the memory page where the error occurs, the log information may not be written to the memory page, and the Kdump system may be started subsequently, and the crash kernel may be called to copy the error information. The memory page where the serious error occurs may not be reused, thereby avoiding the MCE exception of the interrupt number 18 being triggered again.

For description purposes only, the embodiment shown in FIG. 2 is used as an example to illustrate the error information processing method of the present disclosure, and does not limit the implementation manner and application scenarios of the error information processing method of the present disclosure. In various embodiments, the implementer may adopt any applicable implementation manner according to specific implementation conditions, and may be applied to any applicable application scenario.

Figure 3:
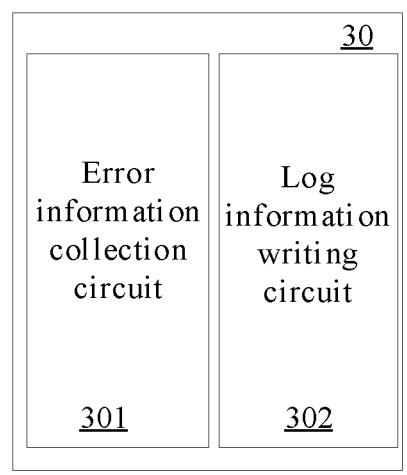
FIG. 3 is an exemplary error information processing device consistent with the present disclosure.

The present disclosure also provides an error information processing device. As shown in FIG. 3, in one embodiment, the device 30 includes: an error information collection circuit 301 for collecting error information of a memory error including a first memory area where the memory error occurs; and a log information writing circuit 302 for obtaining a second memory area for writing the log information, determining whether the second memory area includes the first memory area, and skipping writing the log information to the second memory area when the second memory area includes the first memory area.

In one embodiment, the device 30 may further include an error information recording circuit, for recording the error information of the memory error when the memory error triggers a first interrupt.

In one embodiment, the log information writing circuit 302 may be specifically configured to obtain the second memory area for writing the log information from the system memory defined in an error record serialization table.

In one embodiment, the log information writing circuit 302 may be further configured to write the log information into a spare memory area of the second memory area.

In one embodiment, the device 30 may further include a spare memory area reservation circuit, configured to reserve a third memory area as a spare memory area of the second memory area during system initialization.

In one embodiment, the device 30 may further include a memory area processing circuit, configured to obtain a fourth memory area that needs to be used by a first processing program for processing the first interrupt, determine whether the fourth memory area includes the first memory area, and mark the first memory area as unavailable when the fourth memory area includes the first memory area.

In one embodiment, the device 30 may further include: a memory area acquisition circuit, configured to acquire a fifth memory area that does not include the first memory area; and a memory area allocation circuit, configured to allocate the fifth memory area to the first processing program for use.

In one embodiment, the first processing program may include a crashed kernel program. Correspondingly, the memory area processing circuit may be specifically configured to modify the system memory mapping table provided by the kernel crash dump tool to the crashed kernel program, to mark the first memory area as unavailable.

The present disclosure also provides a computer-readable storage medium. The storage medium may include a set of computer-executable instructions, which are used to execute the error information processing method provided by various embodiments of the present disclosure when the instructions are executed.

The present disclosure further provides a device including a processor and a computer-readable storage medium storing a set of computer-executable instructions that, when executed by the processor, causes the processor to perform an error information processing method consistent with the disclosure, such as any of the above-described example methods.

The descriptions of the embodiments of the error information processing device, the computer-readable storage medium, and the device are similar to the descriptions of the foregoing method embodiments, and have similar beneficial effects as the foregoing method embodiments. Thus, detailed descriptions thereof are not repeated. For the technical details that have not been disclosed in the descriptions of the embodiments of the error information processing device, the computer-readable storage medium, and the device in the present disclosure, reference can be made to the descriptions of the foregoing method embodiments of the present disclosure.

In the present disclosure, the terms "comprising," "including" or any other variation thereof are intended to encompass a non-exclusive inclusion such that a process, method, article or device comprising a list of elements includes not only those elements, but also others not expressly listed elements, or also include elements inherent to such a process, method, article or apparatus. Without further limitation, an element qualified by the phrase "comprising a . . ." does not preclude the presence of additional identical elements in a process, method, article or apparatus that includes the element.

In the embodiments provided in the present disclosure, it should be understood that the disclosed system, device, and method may be implemented in other ways. For example, the device embodiments described above are only illustrative. For example, the division of the units is only a logical function division, and there may be other divisions in actual implementation. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may also be electrical, mechanical or other forms of connection.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments of the present disclosure.

In addition, the functional units in the various embodiments of the present disclosure may be integrated into one processing unit, or each unit may exist alone physically, or two or more units may be integrated into one unit. The above-mentioned integrated unit can be implemented in the form of hardware or software functional unit.

A person of ordinary skill in the art can be aware that all or some of the processes in the method embodiments of the present disclosure can be implemented by hardware related to the program instructions. The program may be stored in a computer-readable storage medium. When the program is executed, the processes of the method embodiments may be executed. The aforementioned storage medium includes: a mobile storage medium, a read-only memory (ROM), a magnetic disk, an optical disk, or another medium that can store program codes.

When the integrated unit is implemented in the form of a software functional unit and sold or used as an independent product, it can be stored in a computer-readable storage medium. Based on this understanding, all or part of the technical solution can be embodied in the form of a software product. The computer software product is stored in a storage medium, and includes several instructions to enable a computer device (which may be a personal computer, a server, or a network device, etc.) to perform all or some of the processes of the method described in each embodiment of the present disclosure. The aforementioned storage medium includes: a mobile storage medium, a read-only memory (ROM), a magnetic disk, an optical disk, or another medium that can store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. An error information processing method comprising, in response to a memory error triggering an interrupt:
   collecting error information of the memory error, the error information including a first memory area where the memory error occurs;
   obtaining a second memory area for writing log information;
   determining whether the second memory area contains the first memory area; and
   in response to determining that the second memory area contains the first memory area, skipping a process of writing the log information into the second memory area.

2. The method according to claim 1, further comprising, before collecting the error information:
   in response to the memory error triggering the interrupt, recording the error information of the memory error.

3. The method according to claim 1, wherein obtaining the second memory area includes:
   obtaining the second memory area from a system memory defined in an error record serialization table.

4. The method according to claim 1, further comprising, after skipping the process of writing the log information into the second memory area:
   writing the log information into a spare memory area of the second memory area.

5. The method according to claim 4, further comprising, before writing the log information into the spare memory area:
   during system initialization, reserving a third memory area as the spare memory area of the second memory area.

6. The method according to claim 1, further comprising:
   obtaining a third memory area that needs to be used by a processing program for processing the interrupt;
   determining whether the third memory area includes the first memory area; and
   in response to determining that the third memory area includes the first memory area, marking the first memory area as unavailable.

7. The method according to claim 6, further comprising, after marking the first memory area as unavailable:
   obtaining a fourth memory area that does not include the first memory area; and
   allocating the fourth memory area to the processing program.

8. The method according to claim 6, wherein:
   the processing program includes a crashed kernel program; and
   marking the first memory area as unavailable includes modifying a system memory mapping table provided to the crashed kernel program by a kernel crash dump tool, to mark the first memory area in the system memory mapping table as unavailable.

9. A device comprising:
   a processor; and
   a computer-readable storage medium storing instructions that, when executed by the processor, cause the processor to, in response to a memory error triggering an interrupt:
   collect error information of the memory error, the error information including a first memory area where the memory error occurs;

obtain a second memory area for writing log information;

determine whether the second memory area contains the first memory area; and in response to determining that the second memory area contains the first memory area, skip a process of writing the log information into the second memory area.

10. The device according to claim 9, wherein the instructions further cause the processor to, before collecting the error information:

in response to the memory error triggering the interrupt, record the error information of the memory error.

11. The device according to claim 9, wherein the instructions further cause the processor to:

obtain the second memory area from a system memory defined in an error record serialization table.

12. The device according to claim 9, wherein the instructions further cause the processor to, after skipping the process of writing the log information into the second memory area:

write the log information into a spare memory area of the second memory area.

13. The device according to claim 12, wherein the instructions further cause the processor to, before writing the log information into the spare memory area:

during system initialization, reserve a third memory area as the spare memory area of the second memory area.

14. The device according to claim 9, wherein the instructions further cause the processor to:

obtain a third memory area that needs to be used by a processing program for processing the interrupt;

determine whether the third memory area includes the first memory area; and in response to determining that the third memory area includes the first memory area, mark the first memory area as unavailable.

15. The device according to claim 14, wherein the instructions further cause the processor to, after marking the first memory area as unavailable:

obtain a fourth memory area that does not include the first memory area; and allocate the fourth memory area to the processing program.

16. The device according to claim 14, wherein:

the processing program includes a crashed kernel program; and the instructions further cause the processor to include modifying a system memory mapping table provided to the crashed kernel program by a kernel crash dump tool, to mark the first memory area in the system memory mapping table as unavailable.

17. A non-transitory computer-readable storage medium storing instructions that, when executed by a processor, cause the processor to, in response to a memory error triggering an interrupt:

collect error information of the memory error, the error information including a first memory area where the memory error occurs;

obtain a second memory area for writing log information;

determine whether the second memory area contains the first memory area; and in response to determining that the second memory area contains the first memory area, skip a process of writing the log information into the second memory area.

18. The storage medium according to claim 17, wherein the instructions further cause the processor to, before collecting the error information:

in response to the memory error triggering the interrupt, record the error information of the memory error.

19. The storage medium according to claim 17, wherein the instructions further cause the processor to:

obtain the second memory area from a system memory defined in an error record serialization table.

20. The storage medium according to claim 17, wherein the instructions further cause the processor to, after skipping the process of writing the log information into the second memory area:

write the log information into a spare memory area of the second memory area.

* * * * *